United States Patent [19]

Walker

[11] Patent Number: 5,579,800
[45] Date of Patent: Dec. 3, 1996

[54] ROTARY VALVE POSITION INDICATOR AND METHOD

[75] Inventor: Daniel Walker, Spring, Tex.

[73] Assignee: Keystone International Holdings Corp., Houston, Tex.

[21] Appl. No.: 270,509

[22] Filed: Jul. 5, 1994

[51] Int. Cl.[6] .............................. F16L 55/18; F16K 37/00
[52] U.S. Cl. .............................. 137/15; 137/554; 137/556
[58] Field of Search .................................... 137/554, 556, 137/15

[56] References Cited

U.S. PATENT DOCUMENTS

| | | |
|---|---|---|
| 3,446,924 | 7/1968 | Giambertoni . |
| 3,522,596 | 8/1970 | Fowler et al. ........................... 137/554 |
| 3,711,797 | 1/1973 | Flanagan et al. . |
| 3,740,680 | 6/1973 | Schneidinger . |
| 3,754,106 | 8/1973 | MacDonald . |
| 3,781,499 | 12/1973 | Reichert et al. . |
| 3,903,383 | 9/1975 | Marker . |
| 4,107,500 | 8/1978 | Distler et al. . |
| 4,160,221 | 7/1979 | Ohara et al. . |
| 4,209,398 | 6/1980 | Ii et al. . |
| 4,214,133 | 7/1980 | Wolford et al. . |
| 4,288,671 | 9/1981 | Morrison . |
| 4,440,721 | 4/1984 | Wilson et al. . |
| 4,497,713 | 2/1985 | Geiger . |
| 4,696,325 | 9/1987 | Magee ..................... 137/554 |
| 4,745,383 | 5/1988 | Zovath et al. . |
| 4,752,657 | 6/1988 | Kane et al. . |
| 4,800,241 | 1/1989 | McNamara . |
| 4,831,350 | 5/1989 | Rose . |
| 4,962,290 | 10/1990 | Nelson et al. . |
| 4,967,792 | 11/1990 | Magee ..................... 137/554 |
| 5,238,022 | 8/1993 | Zink ......................... 137/554 |
| 5,278,530 | 1/1994 | Zovath . |
| 5,295,511 | 3/1994 | Schleinhege et al. ............... 137/554 |

FOREIGN PATENT DOCUMENTS

| | | |
|---|---|---|
| 1283723 | 4/1991 | Canada . |
| 1430612 | 6/1973 | United Kingdom . |

OTHER PUBLICATIONS

"Applications of Capacitive Proximity Switches." Exton, Pennsylvania: Efector, Inc. 1993.
"K–Switch™ Rotary Position Indicator." Bulletin No. K–Switch–590. Houston, Texas: Keystone International, Inc., 1989.
"New Product Release: Magnetic K–Switch™ Rotary Position Indicator." Bulletin No. AP–204. Houston, Texas: Keystone International, Inc., 1993.
"Proximity Switches." Selection Guide SG–10. Exton, Pennsylvania: Efector, Inc. 1993.
"Quadranorm Universal DC Proximity Switches." Quadranorm QN–9. Exton, Pennsylvania: Efector, Inc.
"Sentrol Industrial Product Line." Freeport, Texas: Sentrol Industrial, Jul. 1993.
StoneL Co. Brochure. Fergus Falls, Minnesota: StoneL Co., c. 1992.
"Zensor™ Systems." Missouri City, Texas: ((Z)) Industries, Inc. 1993.

*Primary Examiner*—A. Michael Chambers
*Attorney, Agent, or Firm*—Browning, Bushman, Anderson & Brookhart

[57] ABSTRACT

An improved rotary valve indicator apparatus (10) and method is disclosed that includes an electronics switch housing (15), filled with epoxy or other generally elastomeric material (29) to hermetically seal, thus environmentally seal, the switch housing (15). A pair of hermetically sealed reed switches (30, 32) are employed within the electronics switch housing (15) for indicating the open and closed position of the valve (17). A pair of corresponding magnets (26, 28) are mounted within a separate magnet holder (16) that is mounted to a rotatable member (20) of a rotary valve actuator (13). Light emitting diodes (42, 44) radiate from a side portion (57) of the electronics switch housing (15) and are connected in a manner whereby they indicate not only that the respective switch (30, 32) is closed but also that it is conducting electricity. Additional electronics switch housings (15A) are stacked upon each other and additional magnet holder housings (16A) are stacked upon each other to provide for multiple circuits that may be operated at differing voltages or types of power. The electronics switch circuit (14) operates with a wide range of power or signals including alternating and direct current.

29 Claims, 4 Drawing Sheets

ROTARY VALVE POSITION INDICATOR AND METHOD

BACKGROUND OF THE INVENTION

1. Field of the Invention

This invention relates generally to an electrical apparatus for remote monitoring of a rotary valve position. More specifically, this invention relates to an improved construction of a rotary valve position indicator.

2. Description of the Background

Remote monitoring and control of flow systems having numerous valves is often provided by computers using specialized software. An electrical valve position indicator may be used with each monitored valve to provide a signal to the system control computer. Generally, the signal provided by a valve position indicator is indicative of a status condition of the particular valve, such as whether the valve is fully open, fully closed, partially open, and so forth.

Electrical devices that have been used in the past to perform this function have had numerous problems. For instance, the switch indicators available to monitor valves must be sturdy and so are often supplied in large, bulky housings that have numerous crevices, dead end holes, and other irregularities. Such devices often tend to collect dirt in the cracks and crevices and so are not suitable for operation in food processing environments, such as breweries, that require a high degree of cleanliness.

The electrical switches used in these bulky indicators often have "bounce" problems that may produce false signals in a control system. Furthermore, the switch contacts in such devices are often affected by moisture or other factors so that even if the contacts close properly, they may still have too much contact resistance to allow proper electrical signal flow. This may be especially true for relatively low amperage signals associated with solid state automation control systems. Such problems may cause system operation errors by producing false or intermittently faulty signals.

Even sealed contacts may eventually develop contact resistance problems. Due to the weather-proof or explosion-proof housings of electrical contact boxes, it is difficult and time-consuming for an operator to check whether a fault condition is the result of the contacts being closed but not conducting, or whether the contacts failed to close altogether, or whether the electrical problem lies somewhere in the cabling or interconnections. Once the housing is removed, the contact box is no longer explosion-proof and activation of a switch during checking or maintenance could ignite flammable or explosive vapors.

As well, electrical connections to the housings are often difficult and time-consuming to complete because they require disassembly of covers or lids from their respective bases. If the cover or lid is not properly reassembled, then leakage eventually occurs that may cause system problems. In some cases, electrical cable conduits go through various ambient temperature conditions that cause them to gradually fill with condensation that eventually makes its way back into otherwise weatherproof switch housings. Weather-proof switches may not be adequately sealed when the switch housings are flushed with fluids or submersed as could happen when a plant is being cleaned.

Furthermore, heavy and bulky valve position indicators, though sturdy, may be easily broken or damaged if dropped, or due to corrosion, or due to leakage in the switch indicator housings. The mounting of the switch indicator devices to the valve actuator assemblies is often cumbersome and difficult because it requires threading and tightening of numerous small screws or nuts. The metallic construction of many switches eventually results in corrosion that causes the switch installation to physically seize up, weaken or come loose, leak, or otherwise operate in an undesirable manner.

Heavy valve switch boxes are expensive and require considerable ongoing maintenance. Because the switch indicators are large, bulky, and clumsy, they are difficult to manufacture and have tended in the past to spawn many different non-standardized brands that may have to be used in a single system. Switch packages are typically cumbersome in that two separate packages must be used to provide an open position switch and a closed position switch.

The power supplied to some valve position indicators, especially those that use inductive or capacitive proximity detectors, requires precise voltage specifications and cannot be used without modification for both alternating and direct current power. Power fluctuations may cause false signals to be produced in such valve position indicators to thereby deleteriously affect the computer control system.

As well, valve position indicators are typically sensitive to load variations. For instance, a valve position indicator designed for use with an inductive load may cause system problems when used with a solid state load. A solid state valve position indicator that is required to even momentarily switch a load outside its tolerances will often fail.

Consequently, there remains the need for an improved rotary valve indicator that offers dependable operation at reduced levels of capital investment, is compact, is easily cleaned, handles small power signals without contact bounce problems, operates reliably even with wide power fluctuations and different types of loads, provides hermetically sealed switch contacts, is rugged and reliable, is submersible and explosion proof, is easily mounted, requires little maintenance and is of such low cost that it can be thrown away if failure occurs. Those skilled in the art have long sought and will appreciate the present invention, which provides solutions to these and other problems.

SUMMARY OF THE INVENTION

Therefore, an object of the present invention is to provide an improved rotary valve position indicator.

Another object of the present invention is to provide for local visualization of contact operation.

Yet another object is to provide a smaller and less complex switch position indicator that is insensitive to a wide range of power fluctuations and operates with either alternating or D.C. power.

Yet another object is to provide a valve position indicator that is unaffected by moist or even submersed operating conditions.

Yet another object is to provide a switch package that will not create any sparking or arcing, even under maintenance circumstances, in an explosive atmosphere.

A feature of the present invention is a rotating magnet holder housing separate from an electronics switch housing.

An advantage of the present invention is reduced costs for an improved product.

Another advantage of the present invention is reduced user costs because maintenance costs are decreased by using throwaway device logic.

Yet another advantage of the present invention is to provide end of travel indicators for both open and closed valve positions in a single switch housing.

The present invention provides for an indicator assembly to indicate a valve position of a rotary valve element. The rotary valve element is rotatable by an actuator assembly that is typically disposed in an actuator assembly housing. The actuator assembly includes a rotational element that rotates along with the rotary valve element to open and close the valve. The indicator assembly includes a magnet holder attached to the rotational element of the actuator assembly with a magnet disposed in the magnet holder for rotation along with the rotary valve element. An electronic switch housing is also mounted to the rotary actuator housing adjacent to the magnet holder so that the rotary actuator housing independently supports the electronic switch housing and the magnet holder, respectively, at a selected distance therebetween. The electronic switch housing includes a reed switch therein that is responsive to rotation of the magnet for indicating a position of the rotary valve element. In a preferred embodiment, the electronic switch housing may be connected to the actuator housing by a fastener, such as a threaded fastener. The electronic switch housing is open to ambient conditions associated with the valve. Light-emitting diodes are preferably electrically connected to the outputs of the reed switches so as to provide a readily obtained local verification that the switch is not only closed, but that it is also conducting.

In operation, at least two magnets are preferably provided in the magnet holder. The magnet holder is connected to the rotational element of the rotary actuator. The electronic switch housing may be sealed with epoxy or other electrically nonconductive sealing material. Each magnet independently operates a respective reed switch. The electronic switch housing is mounted to the actuator housing independently of the magnet holder. As the actuator is activated, the magnets operate the reed switches to indicate the open or closed position of the valve.

Other features and intended advantages of the present invention will be more readily apparent by reference to the following detailed description in connection with the accompanying drawings.

While the present invention will be described in connection with presently preferred embodiments, it will be understood that it is not intended to limit the invention to those embodiments. On the contrary, it is intended to cover all alternatives, modifications, and equivalents included within the spirit of the invention and as defined in the appended claims.

DETAILED DESCRIPTION OF THE PREFERRED EMBODIMENTS

The present invention provides generally for an improved rotary valve position indicator and method. The rotary position indicator of the present invention is preferably characterized by its separation of magnet holder housing and electric switch circuitry. This construction produces two housings, rather than one housing with a rotatable portion built into the housing as is seen in prior art rotary position indicators. The result is an indicator assembly with two smaller and more convenient overall size housings, sturdier construction, and uncomplicated operation. Those skilled in the art will immediately appreciate that the present invention is a great improvement over prior art rotary valve position indicators. The preferred separate mounting of a rotary magnet holder housing from the electronics control box effectively eliminates those problems associated with rotating components within a single housing. In fact, the relatively simple improvement of placing the magnets and switches in separately mounted housings produces numerous surprising advantages, as discussed hereinafter, that provide solutions to many problems that have plagued prior art valve position indicators.

Figure 1:
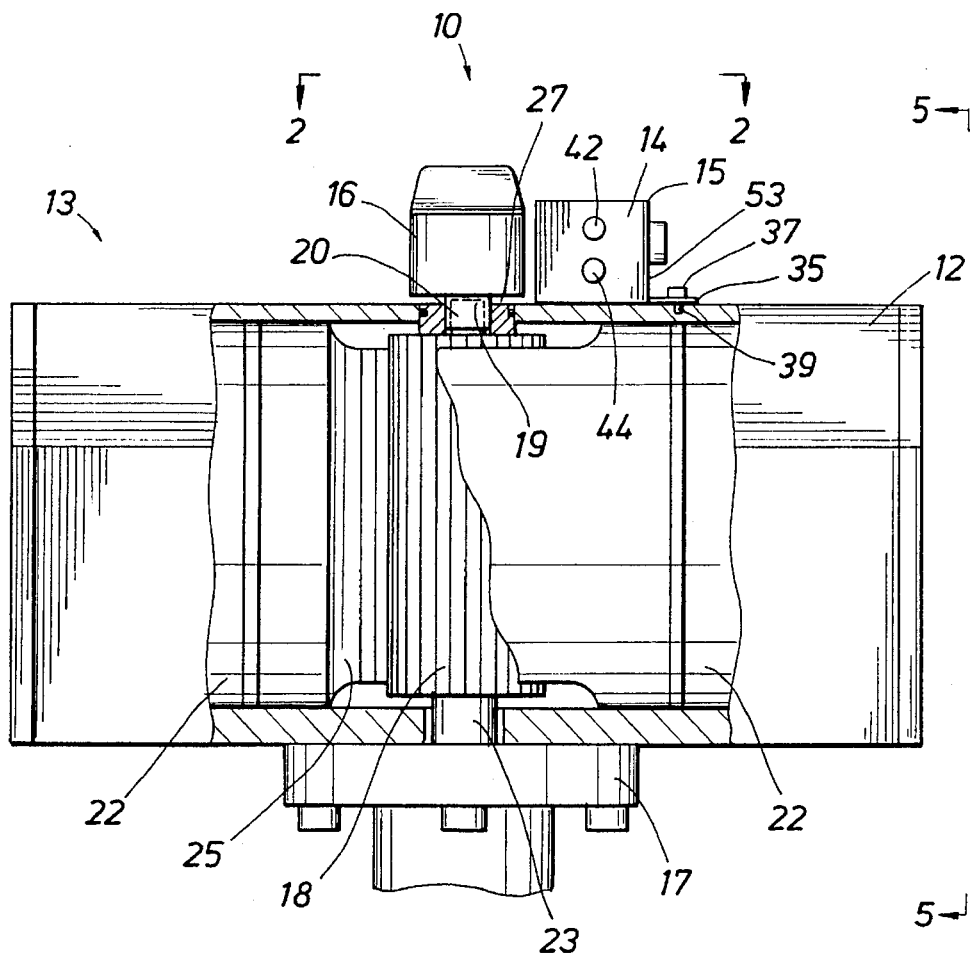
FIG. 1 is an elevational view, partially in section, of a rotary valve indicator mounted to a valve actuator in accord with the present invention.

With reference now to the drawings, and more specifically to FIG. 1, there is shown a position indicator assembly 10, mounted to valve actuator housing 12 of actuator 13. Position indicator assembly 10 includes electronic switch 14 and magnet holder 16.

Figure 2:
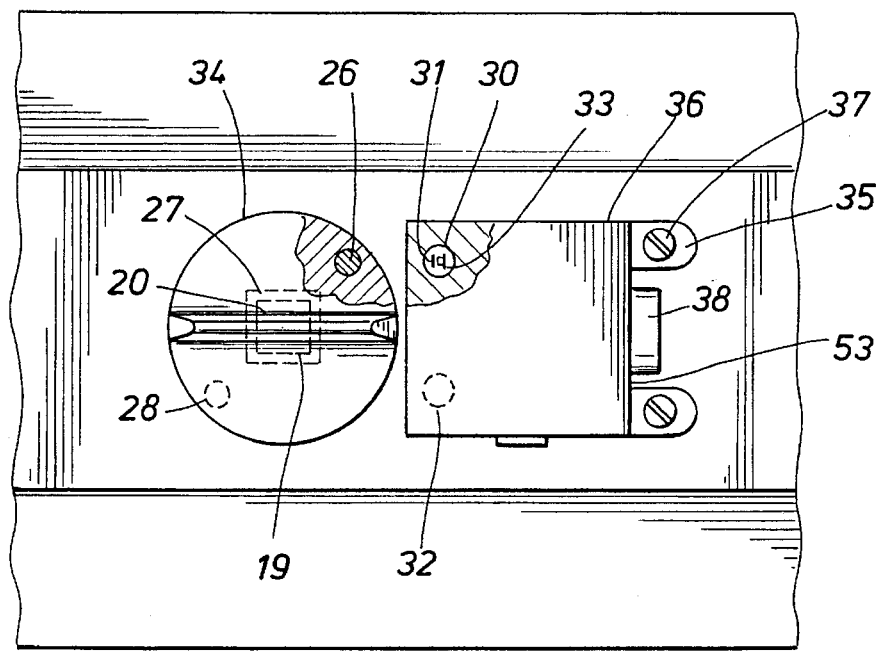
FIG. 2 is an upper view, partially in section, of the rotary valve indicator of FIG. 1 along the line 2—2.
Figure 5:
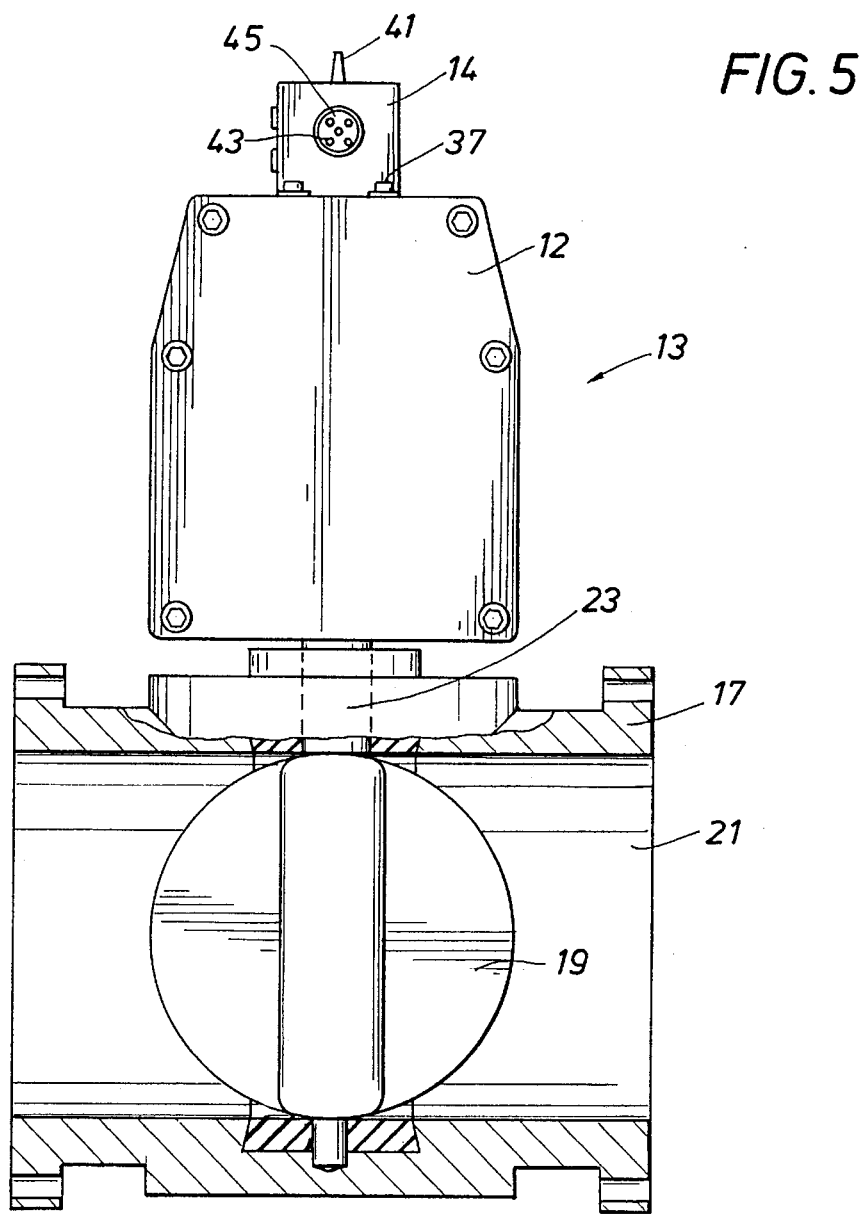
FIG. 5 is an elevational view, partially in section, of the rotary valve indicator of FIG. 1 along the line 5—5.

Valve actuator housing 12 is mounted to rotary valve 17 (see FIG. 5). Rotary valve 17 includes rotary valve element 19 that rotatably moves between an open and a closed position to control fluid flow through bore 21. Rotary actuator 13 may be electrically, pneumatically, manually, or otherwise powered, for rotary movement of rotary valve element 19. In FIGS. 1, 2, and 5, rotary actuator 13 is of the pneumatic type, with pneumatic pistons 22 having racks 25 secured thereto for engaging and rotating pinion 18 to open and close rotary valve 17. Actuator shaft 20 is rotatable and is preferably connected, directly or indirectly, to rotary valve shaft 23 that rotates rotary valve element 19. Magnet holder housing 16 is mounted on actuator shaft 20 of rotary actuator 13 and rotates therewith. Therefore, magnet holder housing 16 also rotates in concert with rotary valve shaft 23 and corresponding rotary valve element 19.

Magnet holder housing 16 preferably contains two magnets 26 and 28, each producing a magnetic field, that are used to indicate the open and closed positions of valve 17. Magnets 26 and 28 may be arranged in various configurations, as desired, to activate reed switches 30 and 32, which are correspondingly arranged to most suitably receive the respective magnetic fields of the magnets. While magnets 26 and 28 are preferably mounted within substantially cylindrical magnet holder housing 16, they could also be on arms (not shown), in a disc (not shown) that could rotate above switch housing 15, or in numerous other configurations as desired.

The relative position of the magnets 26 and 28 with respect to reed switches 30 and 32, and more particularly switch contact elements 31 and 33, shown with respect to reed switch 30, determine the degree of rotation of valve element 19 at which reed switches 30 and 32 open and close. Because the switches of the present invention are magnetic and have no wear, the particular point of opening and closing during rotation of valve element 19 does not change due to electrical variations or mechanical wear that occurs in other switches. The operating repeatability of opening and closing of the switches, with respect to position of the valve, stays within about plus or minus one-half degree. An adjustment mechanism (not shown) may be used herewith to adjust the particular valve angle at which the opening and closing of the switches occurs.

The magnets 26 and 28 are preferably of the rare earth type so as to provide relatively constant magnetic field strength over a long period of time, although other types of suitably long-lasting magnetic material could also be used. With long-lasting magnets, the reed switches are reliably operated in a stable manner over a long period of time, so that there is no significant signal timing variation due, for instance, to aging of the magnet. Magnets 26 and 28 may be encapsulated, if desired, to reduce the possibility of any corrosion that could affect magnet strength. In a presently preferred embodiment, magnet housing 16 has a substantially square or rectangular socket (or plug) mounting 27 (see especially FIG. 2) that secures its position with respect to the preferably square or rectangular end portion 19 of actuator shaft 20.

Figure 3:
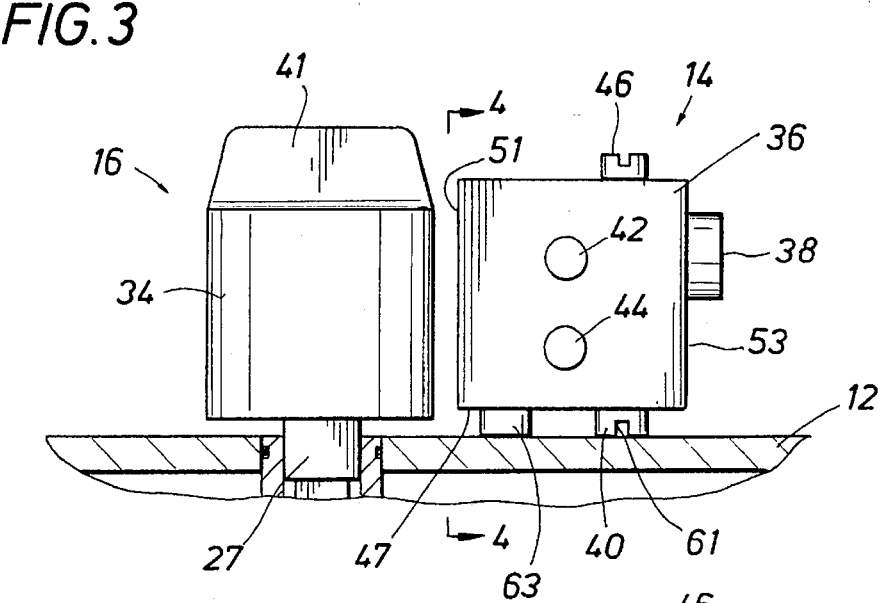
FIG. 3 is an elevational view, partially in section, of an alternative embodiment rotary valve indicator.
Figure 4:
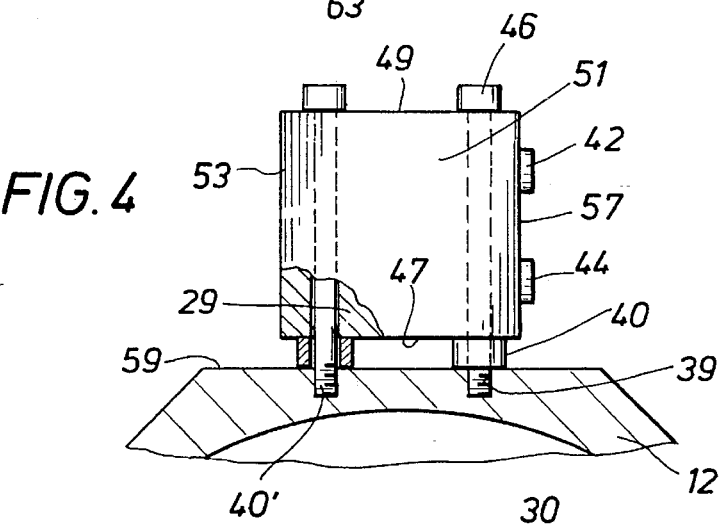
FIG. 4 is an elevational view, partially in section, of the switch housing of FIG. 3 along the line 4—4.

Switch housing 15 may be mounted to actuator housing 12 with brackets 35 and screws 37 at threaded mounting holes 39. Alternatively, switch housing 15 may be mounted on stand-offs 40 with threaded bolts 40 (see FIGS. 3, 4, and 6). Bolts 40 may extend through electronics switch 14 or may be accessible through an aperture through the housing. Blank stand offs 63 do not have a bolt therethrough but are preferably molded onto switch housing 15 for additional support. The mounting stand offs 40 preferably have weep slots 61 therein. Weep slots 61 allow any liquid which may enter at the head of securing bolts 40 to flow out or evaporate rather than become trapped so as to produce mold or bacteria. This latter mounting method may be preferred for valve operation in sterile environments where surfaces are preferably exposed to the ambience so they can be more easily cleaned. A sterile environment in which such a mounting may be desired could, for instance, include a brewery with an automated valve system.

As discussed briefly hereinbefore, Applicant preferably mounts the magnets separately from the reed switches in a separate magnet holder housing 16 and electronics switch 14 because such a configuration results in surprisingly numerous benefits. This separate construction results in less complex, smaller, more compact, sturdier, and more easily mounted components. This simple construction avoids the problem of cracks and crevices that can collect debris, as is undesirable in a sterile environment, because the separate electronics switch box 15 and magnet housing 16 are easily formed with smooth walls, such as smooth walls 34 and 36 on the switch box and magnet housing, respectively. While magnet housing 16 and switch box housing 15 have the shape herein disclosed, they could have other shapes as desired.

Mounting wall 47 may for some purposes be preferably raised by stand-offs 40 and 63 so as to allow easy, unobstructed cleaning when necessary for a sterile environment. A smoothly raised elongate portion 41 on magnet housing 16 may be used to visually indicate whether valve 24 is open or closed. Preferably switch box 15 is box-like and has six sides 47, 49, 51, 53, 55, and 57. The mounting is preferably made using just one side of switch box 15 to prevent the formation of unnecessary cracks and crevices during the mounting. As shown, lower side 47 is used in FIG. 3 and an outer side 53 is mounted with brackets 35 in FIG. 2. Thus, the remaining sides are connected to actuator housing 12 only by virtue of their connection to switch box 15 and not due to other external connecting members that form additional cracks and crevices.

Switch housing 15 and magnet holder 16 are clearly not held together by a larger housing or interconnected structure as used in the prior art, but are separately and independently mounted and supported by actuator 13. The magnet-reed switch spacing between switch housing 15 and magnet holder 16 is normally fixed at the desired optimal spacing by the positioning of threaded mounting holes 39 in outer surface 59 of actuator housing 12 (see FIG. 4). Thus, no adjustments are normally required. However, the mounting bracket 35, stand-offs 40, or mounting holes 39, or mounting method could be reconstructed or designed for a different magnet-reed switch spacing.

Because electronics switch 14 is small and effectively includes no moving parts, switch box 15 is easily sealed if desired, as by filling with epoxies or other nonconducting materials. Therefore, electronic switch box 14 is preferably filled with a sealing material 29, such as epoxy, elastomeric material, or the like (see FIG. 4). Although reed switches 30 and 32 contain movable contact elements 31 and 33, the contact elements are hermetically sealed so that the switches are conveniently epoxied in place if desired.

To maintain switch tolerances, it is desirable that the magnets and switches be securely mounted, within the respective switch housing 15 and magnet holder housing 16, in a manner that will not change due to vibration or even severe shocks such as if switch housing 15 or magnet housing 16 is dropped during, for instance, transport or assembly. Because housings 15 and 16 are preferably filled with epoxy or other such material, secure mounting of the switches and magnets is not a problem in the present invention. This sturdy mounting provides a great advantage over prior art assemblies that normally cannot be dropped or otherwise experience significant g-shock and/or extensive vibration without damage or calibration variations.

To further enhance electronics switch 14 sealing, it is possible to include a preferred embodiment connector socket 38 therewith, which may conveniently include five pins 43 (see FIGS. 2, 3, 5, and 6) and have a sealed socket interior portion 45, to prevent condensation from reaching the interior of switch box 15. If switch box 15 is filled with epoxy sealing, such condensation would not reach any operating components even without a sealed socket interior portion 45. Connector socket 38 may also be of the type that is used with a flange-type plug (not shown), such as a connector assembly available from Brad Harrison or other connector manufacturers, that quickly and securely provides a good electrical connection. Other connections may also be used. For instance a conduit (not shown) may be installed directly to connector 38 without a sealed interior portion 45 but having several feet of leads extending therefrom to be threaded through the conduit. The sealed switch housing 15 remains water tight. As well, because switch housing 15, including switches, L.E.D.'s, and circuitry, is completely filled with epoxy, the present invention is effectively explosion-proof so as to be useable in areas which become filled with explosive or highly flammable vapors.

Open indicator 42 and closed indicator 44 provide a visual indication of whether a respective reed switch 30 or 32 is activated. For instance, with reference to FIG. 7, which shows a simplified schematic diagram of the circuit of switch 14 within switch housing 15, open indicator 42 will light when corresponding reed switch 30 is magnetically activated to make contact by a corresponding magnet. Open and closed indicators 42 and 44 are preferably L.E.D.'s (light emitting diodes).

Figure 7:
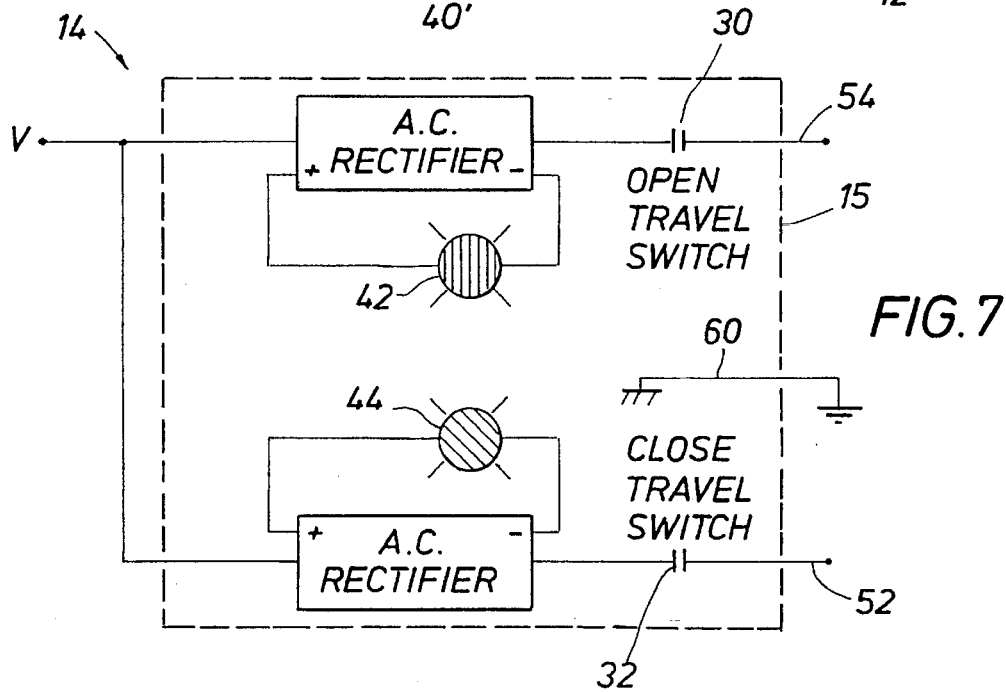
FIG. 7 is a schematic for an electronic switch in accord with the present invention.

In operation of the electronic circuit of switch 14 shown in FIG. 7, voltage from a power source or signal source V is applied to reed contacts of reed switches 30 and 32. When rotary valve element 19 is in a closed position, contacts of reed switch 32 will close to connect light 44 to control devices (not shown) and activate light 44. Voltage V is also applied to output line 52 to indicate that valve 17 is closed. Reed switch 30 is open so that light 42 is off and output line 54 is de-energized. As rotary valve element 19 moves from the closed position to the open position, both lights and output lines will be disconnected from voltage V, and the computer system will sense the valve is moving. When rotary valve 19 moves to the open position, light 42 is on and output line 54 is connected to voltage V.

Reed switches 30 and 32 have small contact mass and therefore are not likely to produce contact "bounce" that could disrupt output signals to a system that may be connected to output lines 52 and 54. Furthermore, hermetically sealed reed switches 30 and 32 are less likely than large contacts to develop contact resistance due, for instance, to corrosion. Contact resistance sometimes prevents otherwise closed switches from conducting relatively small analog and control signals that are typically between about 4 to 20 milliamperes. Such signals are typically greater than about 2 milliamperes. A preferred embodiment switch may be designed for about 25 VA. Thus, with a 24 volt AC or DC power, it may provide up to about 1 ampere of current. With 120, volts it provide up to about 0.2 amperes of current. The use of reed switches in the present invention, rather than electronic switches, allows considerably wide signal tolerances. Reed switches can often take temporary overloads whereas electronic switches normally fail immediately with an overload.

Another advantage of the circuit and configuration of the present invention is that the L.E.D.'s are connected in a manner that not only determines the status of the valve but also indicate that the relevant switch is closed and actually does conduct the small signal levels that are also used to activate the L.E.D.'s. Thus, a technician can readily determine, without having to open a sealed enclosure and perform current checks, whether the switch is functioning correctly-a job that is difficult and time-consuming. Small analog and control signals are typically about 4 milliamperes and normally not larger than about 200 milliamperes, although reed switches may have a significantly greater current carrying ability.

Figure 8:
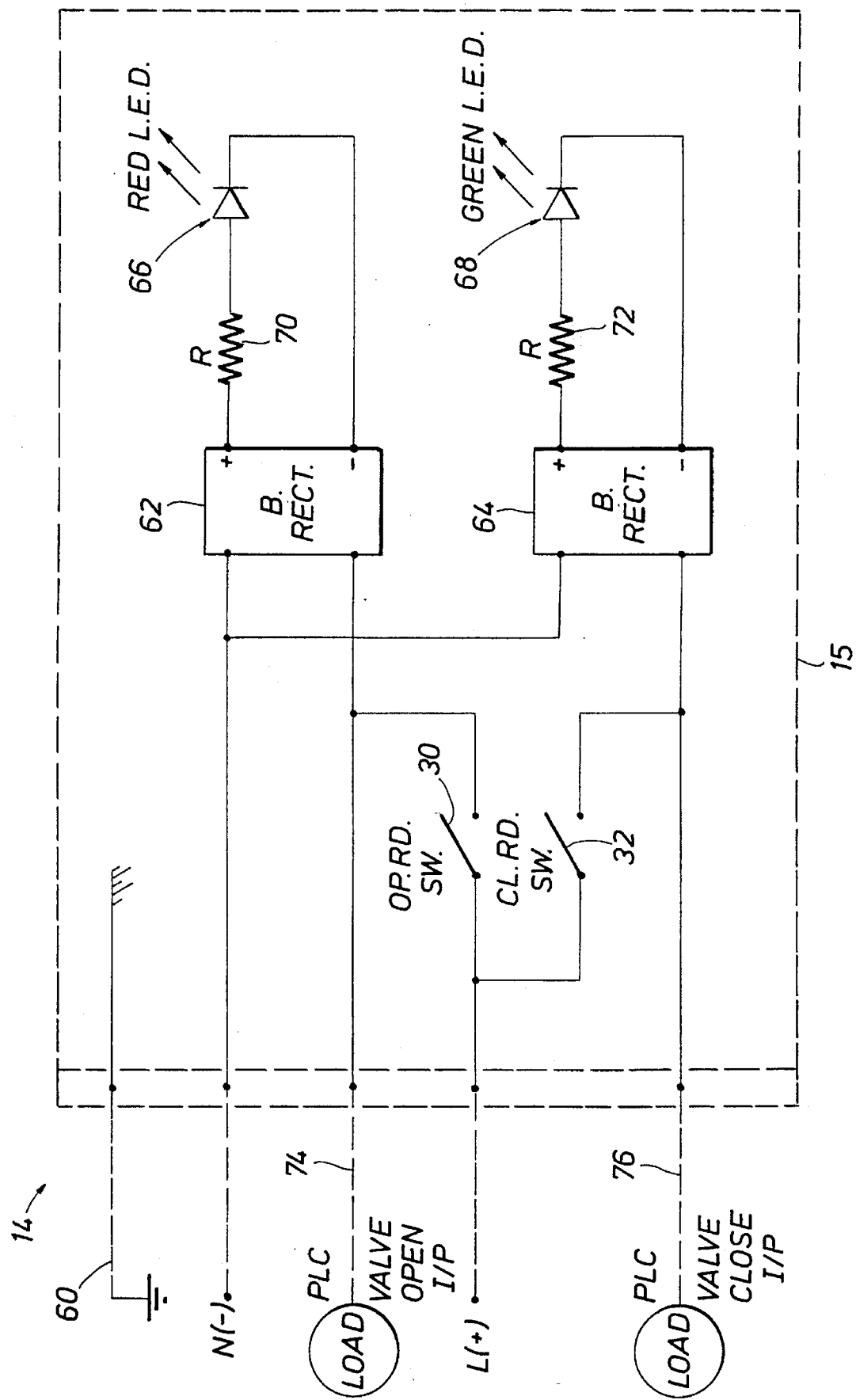
FIG. 8 is an alternative embodiment schematic for an electronic switch in accord with the present invention.
Figure 8:
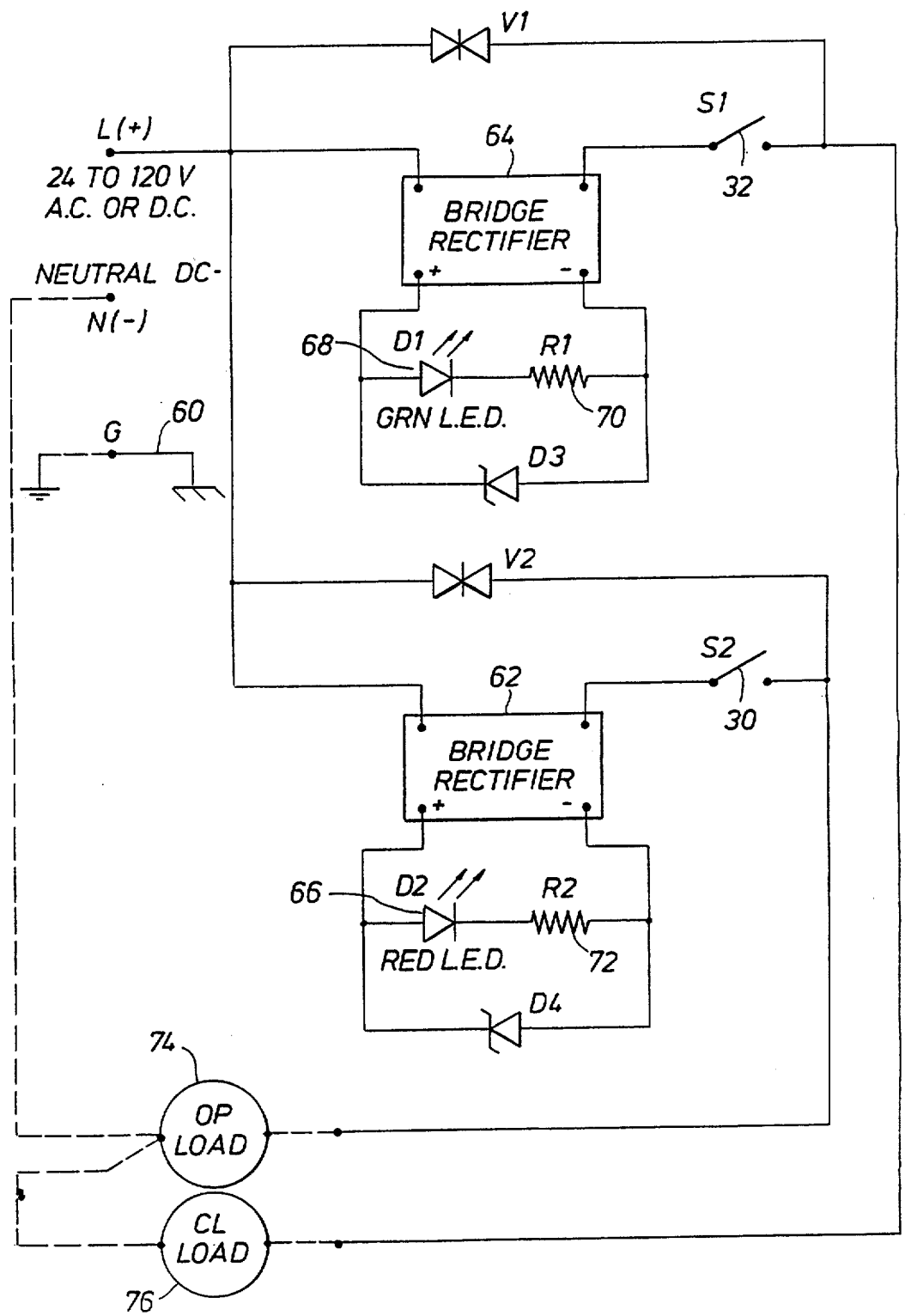

Another presently preferred circuit embodiment for electronic switch 14 is shown in FIG. 8. Voltage L(+), which is typically a system voltage, may be either direct current or alternating current and will typically range from 24 to 120 volts A.C. or D.C. As well, the circuit of FIG. 8 will work for wide tolerances in voltage L(+). Thus, the circuit of FIG. 8 has significant advantages over many proximity detector circuits that require a fairly close tolerance voltage L(+). Typical values for operating voltage L(+) of the present embodiment may be 24 volts up to 120 volts AC or DC, with a wide tolerance for these voltages. The wide range of possible supply voltages do not adversely affect operation of either the switches or the L.E.D.'s. L(+) is applied with respect to N(−), which may be a circuit ground, common, system ground value, chassis ground, or could be a negative voltage, and so forth. Ground may also be applied by ground line 60. The dashed lines shown in FIG. 8 generally represent field wiring external to switch housing 14.

Bridge rectifiers 62 and 64 provide that either alternating current or direct current will activate respective L.E.D.'s 66 and 68. Zener diodes D3 and D4 are parallel with respective L.E.D.'s to ensure a constant voltage even with quite wide variations in power. Varistors V1 and V2 protect switches 30 and 32, as well as respective bridge rectifiers 62 and 64, from damaging back emf's that occur as the switches open to thereby interrupt supply to an inductive load such as a relay coil and the like. Resistors 70 and 72 limit current to respective L.E.D.'s to prevent damage and promote long life. Switches 30 and 32 function to indicate that rotary element 19 is, respectively, open or closed. Output lines provide the status information, as determined by the position of switches 30 and 32, to the open and closed loads 74 and 76, respectively, applied by the control system.

In operation, a respective normally open reed switch will close at the end of valve actuator 13 travel to allow current to flow. This output is used by the customer to energize a load i.e. relay coil, solenoid, P.L.C. input, and the like. The L.E.D. can only be illuminated if (1) the respective reed switch is closed, and (2) the respective reed switch is also conducting electricity. Thus, illumination of the L.E.D. provides proof to service personnel that the switch is operational. As well, red L.E.D. 66 is typically used to visually indicate an open valve and green L.E.D. 68 indicates a closed valve.

The circuit of the present invention will operate on 6 to 120 volts A.C. or D.C. and even has wide operating tolerances with that range of operation voltage. If the A.C. line or D.C. positive supply is connected to terminal point of L(+), then current will flow through the full wave bridge rectifier assuming the respective normally open reed switch is closed. If a respective reed switch is not closed, then the respective output 74 or 76 will not be driven and the respective L.E.D. cannot be illuminated. The respective load will also see a very high impedance when the switch is open because the impedance of the varistors, V1 and V2, is normally very high as discussed hereinafter.

If valve actuator 13 is run fully open or closed, then a respective of magnets 26 and 28 in magnet holder 16 will be rotated into the appropriate reed switch magnetic activation field. The selected switch will close its contact and drive the customer's load device, and the respective rectifier will therefore have current flowing through it and will produce a D.C. voltage supply on its ± terminals. The respective Zener diode will shunt off voltage and hold a steady value across the L.E.D. branch circuit. A respective of resistors 70 and 72 is placed in series with each L.E.D. to limit the current flow through the L.E.D. within its design parameters.

Varistors V1 and V2 are located in the circuit across the respective bridge rectifiers and reed switch contacts. The varistors have no effect on the circuit (very high impedance) provided that the voltage potential does not exceed the respective varistor rating. However, if a voltage spike appears in the line, or the switch opens to de-energize an inductive load i.e. a relay coil, then the resultant back emf's damaging effect on the contact and bridge rectifier will be minimized. The varistor's ability to clip-off dangerous power spikes also minimizes the magnitude of any arcing that occurs when switch contacts break an energized circuit, thus prolonging contact life. In this manner, the varistors provide over-voltage and back emf protection to the switches.

In summary, the present circuitry is usable with a wide range of supply voltages and types of loads, includes a self-test L.E.D. that eliminates questions of switch operation to reduce service time, and is sealed in a rugged, water proof, explosion-proof package.

Figure 6:
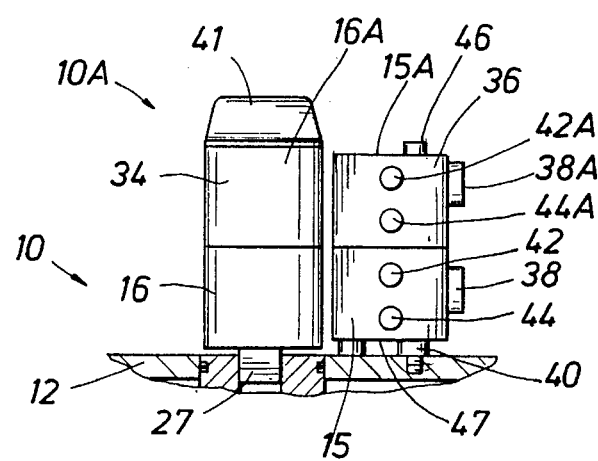
FIG. 6 is an elevational view, partially in section, of stacked switch housings and magnet holders.

With reference now to FIG. 6, yet another feature of the present invention is shown that allows for multiple circuits operating at different voltages. For instance, an emergency shutdown circuit may be connected to switch indicator 10A, and the computer control system could be connected to switch indicator 10. Each system could operate at separate voltages. However, closed and open signals at those separate voltages would be available by the stacked switch boxes 15 and 15A operated by respective stacked magnet holders 16 and 16A. Other respective features discussed earlier are referred to with an "A" suffix. The size and shape of the housings of the present invention are very suitable for such stacking, which may be used to provide two or more circuits attached to a single actuator housing 12.

The foregoing disclosure and description of the invention is illustrative and explanatory thereof, and it will be appreciated by those skilled in the art that various changes in the size, shape, positioning, and materials, as well as in the details of the illustrated construction or combinations of features of the various elements, may be made without departing from the spirit of the invention.

What is claimed is:

1. A method for indicating a position of a rotary valve element, comprising the following steps:
   providing at least two reed switches within a switch housing, each of said two reed switches being independently operable by first and second magnetic fields;
   providing at least two magnets within a first magnet holder;
   mounting said first magnet holder to a rotational element of a rotary actuator;
   independently removably mounting, with respect to said magnet holder, said switch housing to a different portion of said rotary actuator; and
   providing a smooth outer surface on said switch housing and providing a separate smooth outer surface on said first magnet holder.

2. The method of claim 1, further comprising:
   selectively supplying either alternating current or direct current to said switch housing.

3. The method of claim 1, further comprising:
   stacking a second magnet holder on top of said first magnet holder.

4. The method of claim 2, further comprising:
   connecting a light-emitting diode to each of said reed switches in a manner that each said respective light-emitting diode is activated when a respective said reed switch is conducting said selected direct or alternating current.

5. The method of claim 1, further comprising:
   each of said two reed switches being mounted along one substantially flat wall of said electronics circuit box.

6. The method of claim 1, further comprising:
   hermetically sealing said switch housing.

7. An apparatus for indicating the position of a rotary valve element, said rotary valve element being rotatable by an actuator, said actuator including an actuator housing and having a rotational element rotatable with said rotary valve element, said apparatus comprising:
   a magnet holder attached to and rotatable with said rotational element, a magnet carried by said magnet holder for rotation therewith;
   an electronic switch assembly comprising a switch housing separate from said actuator housing and removably mountable to said actuator housing adjacent to said magnet holder such that said actuator housing independently supports said switch housing and said magnet holder, respectively, at a selected distance therebetween, said switch assembly including a reed switch internally of said switch housing responsive to rotation of said magnet for indicating a position of said rotary valve element; and
   a light-emitting diode physically included with said switch housing and electrically connected to said reed switch operable for providing a visual signal when said reed switch is conducting electricity.

8. The apparatus of claim 7, wherein:
   said switch housing comprises a substantially solid body of nonconducting material.

9. The apparatus of claim 7, wherein all surfaces of said switch housing are substantially smooth.

10. The apparatus of claim 7, further comprising:
    a second magnet carried by said magnet holder; and
    a second reed switch internally of said switch housing, said second reed switch being responsive to said second magnet to indicate a second position of said rotary valve element.

11. A valve position indicator for operation with an actuator, said actuator including an actuator housing with an outer surface, said actuator further including an actuator assembly for rotating a rotary valve element, said actuator assembly having a rotational element rotatable with said rotary valve element, said valve position indicator comprising:
    a first electronic switch comprising a first switch housing removably mounted on said outer surface of said actuator housing and substantially filled with an electrically nonconductive material, said first electronic switch further including:
        a first reed switch internal of said first switch housing with first conductors leading to said first reed switch, said first reed switch being responsive to a first magnetic field to provide an indication of a first valve position, and
        a fastener member extending from said first switch housing and connecting to said outer surface of said actuator housing for removably securing said first switch housing to said actuator housing; and
    a first magnet external to said switch housing and movable with said rotational element, said first magnet producing said first magnetic field.

12. The valve position indicator of claim 11, further comprising:
    a magnet holder external of said first switch housing for carrying said first magnet, said magnet holder being independently carried, with respect to said first switch housing, by said actuator at a selected distance from said first switch housing.

13. The valve position indicator of claim 11, further comprising:
    a second magnet carried by said magnet holder;
    a second reed switch internal of said first switch housing for cooperation with said second reed switch, said second reed switch and said second magnet operating separately from said first magnet and said first reed switch to indicate a second position of said rotary valve element.

14. The valve position indicator of claim 11, further comprising:
    a second electronic switch comprising a second switch housing stacked upon said first switch housing, said second electronic switch further including:
        a second reed switch internal to said second switch housing, said second reed switch operating in conjunction with said first reed switch for indicating said first valve position, said second reed switch having second conductors leading to said second reed switch for providing a separate switch circuit.

15. A valve position indicator for operation with an actuator, said actuator including an actuator housing with an outer surface, said actuator further including an actuator assembly for rotating a rotary valve element, said actuator assembly having a rotational element rotatable with said rotary valve element, said valve position indicator comprising:

an electronic switch comprising a switch housing substantially filled with a nonmetallic material for sealing said switch housing, said switch housing having first and second sides, a fastener for removably securing said first side of said switch housing to said outer surface of said actuator housing, said second side of said switch housing being unattached to said actuator except through said first side, said electronic switch further comprising a reed switch internal to said switch housing, said reed switch being responsive to a first magnetic field to provide an indication of a valve position; and a first magnet external to said switch housing and movable with said rotational element, said first magnet producing said first magnetic field.

16. The valve position indicator of claim 15, wherein:

said first and second sides are opposite sides of said switch housing.

17. The valve position indicator of claim 16, wherein:

said electronics switch housing is substantially box-shaped and includes a third side between said first and second sides, said third side being unconnected to said actuator except through said first side.

18. The valve position indicator of claim 17, further comprising:

a light-emitting diode disposed on said third side for providing a visual indication that said reed switch is conducting electricity.

19. The valve position indicator of claim 15, wherein:

said electronics switch housing is substantially box-shaped and said first and second sides are adjacent each other.

20. A valve position indicator for indicating a position of a rotary valve element, said valve position indicator being operable with an actuator including an actuator housing, said actuator further including an actuator assembly within said actuator housing for rotating said rotary valve element, said actuator assembly having a rotational element rotatable with said rotary valve element, said valve position indicator comprising:

an electronic switch comprising a switch housing separate from said actuator housing and removably mountable to said actuator housing, said electronic switch further including:

a first reed switch internal to said switch housing for indicating a position of said valve, a first light source supported by said electronic switch housing and externally visible from said electronic switch housing for indicating that said first reed switch is conducting a control signal less than 25 VA, and an electrical connection between said first reed switch and said first light source; and a first magnet movable with said rotational element, said first magnet producing first magnetic field.

21. The valve position indicator of claim 20, further comprising:

a magnet holder mounted to said rotational element of said actuator housing for carrying said first magnet, said magnet holder housing being external to said switch housing and supported by said actuator housing independently from said switch housing.

22. The valve position indicator of claim 20, wherein:

said electronic switch housing is substantially filled with a nonmetallic substance.

23. The valve position indicator of claim 20, wherein:

said electronic switch housing is substantially box-like, having a first side connected to said actuator housing and a second side opposite from said first side, said light source being mounted on an intermediate side of said electronic switch housing between said first and second sides.

24. The valve position indicator of claim 23, further comprising:

a second magnet carried by said magnet holder for producing a second magnetic field, a second reed switch internal to said switch housing responsive to said second magnetic field, and a second light source for indicating that said second reed switch is conducting electricity.

25. A valve position indicator operable with alternating current or direct current, said valve position indicator being operable with an actuator including an actuator housing, said actuator further including a rotary actuator assembly having a rotational element, said valve position indicator comprising:

an electronics switch comprising a switch housing secured to said actuator housing, said electronics switch further comprising:

a connector to said switch housing having an input power line for receiving said alternating current or direct current, said connector having open and closed outputs for respective open and closed valve position signals, said connector having a common line for said input power line, first and second reed switches each having a contact electrically connecting to respective of said open and closed output lines, said first and second reed switches each being separately operable responsive to first and second magnetic fields, first and second lights to radiate from said switch housing responsively to respective of said first and second reed switches, said first and second lights being electrically connected to said common input power line and said open and closed output lines through respective of said first and second switches; and first and second rectifiers for supplying direct current to said first and second lights from either alternating current or direct current; and a magnet holder housing mounted to said rotational element, said magnet holder carrying first and second magnets to produce said first and second magnetic fields.

26. The valve position indicator of claim 25, further comprising:

first and second resistors for limiting direct current to said first and second lights.

27. The valve position indicator of claim 26, wherein said first and second lights comprise light-emitting diodes.

28. The valve position indicator of claim 25, wherein said magnet housing is external to and independently mounted with respect to said switch housing.

29. The valve position indicator of claim 25, further comprising:

a first and second varistors connected in parallel to said first and second switches and said first and second rectifiers.

* * * * *

UNITED STATES PATENT AND TRADEMARK OFFICE
CERTIFICATE OF CORRECTION

PATENT NO. : 5,579,800
DATED : December 3, 1996
INVENTOR(S) : Daniel Walker

It is certified that error appears in the above-indentified patent and that said Letters Patent is hereby corrected as shown below:

Replace Fig. 8 with the attached Fig. 8.

Signed and Sealed this

Twenty-second Day of April, 1997

Attest:

BRUCE LEHMAN

*Commissioner of Patents and Trademarks*

*Attesting Officer*